Patented Aug. 14, 1945

2,382,497

UNITED STATES PATENT OFFICE 2,382,497

NEW THERMOPLASTIC COMPOSITIONS AND METHOD OF MAKING SAME

George D. Martin, Nitro, W. Va., assignor to Monsanto Chemical Company, St. Louis, Mo., a corporation of Delaware No Drawing. Application October 25, 1941,
Serial No. 416,587

20 Claims. (Cl. 260—768)

This invention relates to new plastic products derived from rubbers and to the preparation of the same.

In accordance with this invention a rubber is treated with an organic phosphine halide. Any organic phosphine halide can be used in the preparation of the new products of this invention as for example aromatic, aliphatic and mixed aromatic aliphatic phosphine halides or mixtures thereof. While phosphine halides in which a carbon atom of an organic radical is linked directly to the phosphorus are preferred other types may be employed. For example phosphorus may be linked to carbon through oxygen, sulfur, nitrogen and the like. Likewise, while chlorides are preferred for reasons of economy, it has been found that useful products are produced from the fluorides, iodides and bromides.

As typical examples of organic phosphine halides which may be employed in the preparation of the new plastic materials may be mentioned the following but the invention is by no means limited thereto: phenyl dichlor phosphine, thiophendichlor phosphine, tolyl dichlor phosphine, 1,3,4 trimethyl phenyl dichlor phosphine, 1,3,5 trimethyl phenyl dichlor phosphine, xylyl dichlor phosphine, biphenyl dichlor phosphine, α-naphthyl dichlor phosphine, tetrahydro naphthyl dichlor phosphine, dichlor phosphine of meta diphenyl benzene, decyl phenyl dichlor phosphine, diethyl amino phenyl dichlor phosphine, dimethyl amino phenyl dichlor phosphine, tertiary butyl phenyl dichlor phosphine, ditolyl chlor phosphine, dixylyl chlor phosphine, tolyl dibrom phosphine, α-naphthyl dibrom phosphine, tolyloxy dichlor phosphine, α-naphthoxy dichlor phosphine, benzyl dichlor phosphine, phosphazobenzol chloride, diphenyl amino dichlor phosphine, thiophenyl dichlor phosphine, anisyl dichlor phosphine, phenetyl dichlor phosphine, meta and para hydroxy phenyl dichlor phosphine, chlor phenyl dichlor phosphine, bromphenyl dichlor phosphine, ethyl phenyl dichlor phosphine, dibenzyl dichlor phosphine, diphenyl methane dichlor phosphine, xylyl dibrom phosphine, xylyl difluor phosphine, dinaphthyl mono chlor phosphine, naphthyl difluor phosphine, di tertiary butyl phenyl mono chlor phosphine, decyl dichlor phosphine, heptyl dichlor phosphine, heptyl difluor phosphine, decyl difluor phosphine, tolyl di iodo phosphine, tolyl difluor phosphine, amyl dichlor phosphine, hexyl dichlor phosphine, butyl dichlor phosphine, amyl dibrom phosphine, diamyl mono chlor phosphine, cymyl dichlor phosphine, dicymyl mono chlor phosphine, cymyl dibrom phosphine, cymyl difluor phosphine, retyl dichlor phosphine, retyl dibrom phosphine, retyl difluor phosphine, tetrahydro naphthyl dibrom phosphine and equivalents and analogues thereof.

Since organic phosphine halides are a well known class of compounds reference may be had to the literature for methods of preparing them. However, while the present application is not concerned with the preparation of these intermediates and is not limited thereto, a Friedel-Crafts synthesis offers certain advantages. Thus, the reaction of a phosphorus tri-halide with a suitable hydrocarbon in the presence of a Friedel-Crafts catalyst results in a composition comprising the organic phosphine halide and catalyst and this crude composition may be reacted with a rubber without isolating the organic phosphine halide. However a certain amount of unreacted ingredients are ordinarily separated before reacting with the rubber. After heating liquid hydrocarbons as for example xylene, toluene or petroleum ether, with a phosphorus tri halide in the presence of anhydrous aluminum chloride there separates after completion of the reaction a top layer which consists essentially of unreacted hydrocarbon and phosphorus tri-halide and a small amount of the desired reaction product. The top layer is simply drawn off and reserved for future preparations. The bottom layer contains the desired reaction product together with a small proportion of unreacted materials, and most of the catalyst, probably in the form of a complex organic addition product. It has been found that this crude mixture remaining after separation of the upper layer is admirably suited for reacting directly with a rubber. While the above picture applies where use is made of the proportions of catalyst given in the literature (see Liebig's Annalen vol. 212, p. 206, 207), it has been found that by increasing the proportion of catalyst the reaction is driven further toward completion so that eventually no layers separate. The entire reaction mixture may then be reacted with a rubber since the products produced, at least for the purposes of this invention, are equivalent to those described above and in fact appear to be identical in every respect. Alternatively the crude reaction product whether a bottom layer or an entire reaction mixture obtained with a higher proportion of catalyst, may be heated up to distill out unreacted phosphorus tri halide and hydrocarbon. Obviously the resulting products are not weight for weight equivalents of the products just mentioned since they contain a higher proportion of active constituent. They will therefore be hereinafter referred to as "stripped" hydrocarbon phosphine halides. In order to distinguish therefrom the unstripped varieties may be called "crude" hydrocarbon phosphine halides. The generic class of hydrocarbon phosphine halides made from a phosphorus tri halide and suitable hydrocarbon in the presence of anhydrous aluminum chloride, whether "crude" or "stripped," containing most of the catalyst used in the preparation will be identified in the disclosure following and in the attached claims as "technical" hydrocarbon phosphine halides.

The following example illustrates in detail the preparation of technical hydrocarbon phosphine halides but is not limitative of the invention:

Into a suitable glass or glass lined reaction vessel fitted with a reflux condenser there was charged 600 parts by weight of toluene, 800 parts by weight of PCl₃ and 120 parts by weight of anhydrous aluminum chloride. The mixture was heated to refluxing temperature at which temperature it was maintained for about 36 hours. When cool the reaction mixture separated into two portions. The bottom layer amounting to substantially 840 parts by weight was drawn off and either immediately reacted with a rubber or stored in moisture proof containers since tolyl dichlor phosphine and analogous materials hydrolyze to the corresponding acids. However the presence of small amounts of water during the subsequent reaction with the rubber has no noticeable effect.

When the aluminum chloride was increased to 140 parts in the above procedure no layers separated.

Crude retyl dichlor phosphine was prepared by charging 600 parts by weight of technical retene, 600 parts by weight of PCl₃ and 90 parts by weight of anhydrous AlCl₃ into a suitable glass or glass lined vessel and heating at refluxing temperature for about eleven hours. Since there was no separation of layers the entire reaction mixture was employed as the reactant.

Obviously, products which are normally solids will not separate as an unreacted liquid layer so that the phosphine halides prepared therefrom are usually extracted from the crude reaction mixture by a suitable solvent such as petroleum ether, and the residue after removal of the solvent employed as the reactant. Further purification serves no useful purpose. However, the addition of a small proportion of a Friedel-Crafts catalyst, preferably anhydrous aluminum chloride, is desirable in order to promote the reaction with a rubber.

Crude tolyl dibrom phosphine and tolyl di-iodo phosphine can be obtained by substituting PBr₃ and PI₃ respectively for the PCl₃ in the procedure described for crude tolyl dichlor phosphine. Since PF₃ is a gas somewhat different technique must be employed to prepare the organic phosphine fluorides.

Although it is not possible to state with certainty the nature of the change taking place upon treating rubber with a phosphine halide, the fact that the hydrocarbon content of the original rubber is materially increased indicates that reaction products of the rubber are produced. The properties of the final product depend upon the reaction conditions, the proportion of reacting ingredients and the like. Thus, the conditions may be varied so as to obtain products ranging from sticky viscous fluids to hard solids. Among the most interesting and useful type of products are very tough rubbery materials.

In general the particular apparatus employed, the presence or absence of a solvent, the temperature, time and the like are not critical factors for obtaining products within the scope of this invention and may be varied according to the particular properties sought in the final product. It is, however, essential that the ingredients be brought into intimate and uniform association if it is expected to get reproducible results. To this end use of a solvent like benzene, toluene or carbon disulfide is of considerable benefit. In the absence of a solvent the phosphine halides tend to make the rubber slimy and slippery during the early stages of the reaction. However, an efficient internal type mixer of corrosion resistant material such as stainless steel will give the proper association of the reactants. This may be of the W. & P. type or modifications thereof but in any case there should be little or no free space above the mixer blades. Use of well broken down rubber further facilitates the reaction. A Banbury mixer or even an ordinary rubber mill may be used but in the latter case it is necessary to enclose the rolls and pass a dry gas through the enclosure or to work in a room of controlled low humidity in order to avoid hydrolysis of the phosphine halide. The latter must be added slowly until the slippery stage has passed after which the remainder may be added at a fairly rapid rate. In addition the batch size should be kept well below that which would normally be employed in milling rubber alone. Tight rolls and a small bank both aid the mixing. Once the reactants have been thoroughly mixed so that the mass is homogeneous throughout it may be removed and placed in an ordinary oven to complete the reaction. The reaction between phosphine halides and rubber takes place over a considerable range of temperatures. Thus, very satisfactory reactions have been carried out over a period of about 48 hours where the temperature was carefully controlled at about 47° or below during the entire period in which the phosphine halide was in contact with the rubber. At higher temperatures, as for example up to about 140° C., the time necessary for reaction becomes increasingly shorter but at temperatures much in excess of 100° C. it is rather difficult to control the reactions so as to obtain reproducible results.

The following specific examples will illustrate the invention in detail and are to be understood as descriptive and explanatory but not limitative of the invention.

*Example I*

A rubber cement was prepared by dissolving 100 parts by weight of pale crepe rubber in a suitable solvent such as for example carbon disulfide. Into the cement so prepared contained in a suitable vessel fitted with a reflux condenser and stirring mechanism there was stirred 200 parts by weight of crude naphthyl phosphine dichloride. Heat was then applied and the mixture stirred at refluxing temperature for about 15 hours after which a Liebig type condenser was substituted for the reflux condenser and the solvent removed by distillation. Heating was continued for a short time after distillation had substantially ceased and then live steam was introduced and after a thorough steaming out, the product was washed with water on a rubber mill or preferably on a mill having corrugated rolls or on other equipment adapted for washing tough plastic products. The washed product was dried to constant weight as for example by milling on a hot mill followed by heating in a vacuum oven. In this manner there was obtained substantially 180.5 parts by weight of a tough yellow rubbery product. This product was found to cure nicely in the presence of sulfur and accelerator and to be resistant to attack by solvents as for example gasoline and lubricating oil. For example a stock was made up as follows, the parts being by weight: 100 parts of the above plastic product, 40 parts Gastex, 10 parts zinc oxide, 5 parts whiting, 3 parts stearic acid, 2 parts pine tar, 2 parts sulfur and 1.5 parts mercaptobenzothiazole. This stock gave a good cure in 30 minutes at the temperature of forty pounds steam pressure per square inch. The cured product showed almost no swelling in lubricating oil after four days immersion at room temperature.

Example II

Substantially 100 parts by weight of pale crepe rubber were dissolved in carbon bisulfide and reacted with 100 parts by weight of crude cymyl phosphine dichloride in substantially the manner described above except that the refluxing period was about 24 hours. 126 parts by weight of a tough tan rubbery material was obtained after drying to constant weight.

Example III

Substantially 100 parts by weight of pale crepe rubber were dissolved in carbon bisulfide and a mixture of substantially 9 parts by weight of anhydrous aluminum chloride and 75 parts by weight of tolyl dichlor phosphine (B. P. 115–117° at 8 mm. pressure) added to the cement so prepared. The charge was heated and stirred at refluxing temperature for approximately 24 hours, the solvent removed and the product worked up all substantially as described in Example I to obtain a tough rubbery product. This product could be cured by heating in a press in the usual manner in the presence of zinc oxide, sulfur and accelerator. After compounding and curing in a typical rubber formula carrying 20 parts by weight of carbon black the composition was found to be insoluble in most organic solvents. After 72 hours immersion at room temperature a strip of the cured stock had gained only 8.4% by weight in gasoline and 4.3% by weight in lubricating oil.

Example IV

Substantially 100 parts by weight of crude tolyl di iodo phosphine were added to a carbon bisulfide cement containing 100 parts by weight of pale crepe rubber. The charge was stirred and heated at refluxing temperature for approximately 17 hours after which the solvent was removed and the product worked up substantially as described in Example I. 143.5 parts by weight of a solid resinous product was obtained.

Example V

Substantially 150 parts by weight of crude tolyl dibrom phosphine was added to a carbon bisulfide cement containing 100 parts by weight of pale crepe rubber. The charge was stirred and heated at refluxing temperature for 48 hours and the solvent removed and the product worked up all substantially as described in Example I. The dry product (145 parts by weight) was brown in color, rubbery and non tacky.

Example VI

Substantially 100 parts by weight of pale crepe rubber was dissolved in a suitable solvent as for example carbon disulfide and 100 parts by weight of crude retyl dichlor phosphine added to the cement so prepared. The charge was allowed to stand at room temperature for approximately 20 hours after which the solvent was removed and the residue washed and dried all substantially as described in Example I. About 148 parts by weight of tough rubbery product remained after drying to constant weight. It was found that this product could be cured in a press in the usual manner after compounding with zinc oxide, sulfur and accelerator and was reinforced by the addition of carbon black. The cured rubber products were resistant to attack by gasoline, lubricating oil and other solvents and were more resistant to ozone than similar stocks compounded from pale crepe rubber.

The reaction can be effected in a shorter time by the application of heat but conducting the reaction for longer times at lower temperatures gives products which for most purposes possess somewhat better properties. For example the above charge was heated to refluxing temperature for an hour and then worked up as usual. While the weight of the final product was the same as before the vulcanizates obtained therefrom were less resistant to ozone. Where harder products are desired the proportion of retyl dichlor phosphine should be increased. Thus a very hard product was obtained by doubling the proportion of retyl dichlor phosphine and heating at refluxing temperature for 15 hours.

Valuable products have also been produced by substituting pale crepe rubber by cheaper reclaimed and scrap rubbers. For example 100 parts by weight of ground truck peels were suspended in carbon bisulfide and 150 parts by weight of crude retyl dichlor phosphine added thereto. The charge was heated to refluxing temperature at which temperature it was stirred and heated for eight hours. The solvent was then removed and the product isolated all substantially as described in Example I. The weight of dry tough rubbery product was 171 parts. While some of the tensile strength and ultimate elongation are sacrificed by replacing pale crepe by the cheaper scrap rubber they are adequate for most purposes and the solvent and ozone resistance are excellent. A stock consisting of 100 parts by weight of the above product obtained from truck peels, 10 parts zinc oxide, 5 parts sulfur, 3 parts stearic acid, 2 parts pine tar, 1.5 parts mercaptobenzothiazole and 20 parts Gastex (all parts are by weight), after curing in a press in the usual manner possessed a tensile strength of 1030 lbs./in.$^2$ and an ultimate elongation of 110%. After 72 hours immersion in gasoline, at room temperature the stock gained 13.4% in weight and in lubricating oil lost 0.4% in weight. Cracking was negligible after three minutes exposure to ozone under stress.

Decreasing the amount of retyl dichlor phosphine in the reaction with truck peels rendered the product softer and more tacky and resistance to ozone was decreased. Increasing the amount gave harder and less rubbery products.

Example VII

Substantially 65 parts by weight of crude heptyl dichlor phosphine was added to a rubber cement prepared by dissolving 100 parts by weight of pale crepe rubber in benzene or other solvent. The charge was heated to the refluxing temperature of the cement and stirred and heated at this temperature for about 18 hours. The solvent was then removed and the residue washed and dried all substantially as described in Example I to obtain 122 parts by weight of a hard granular product.

Example VIII

Substantially 40 parts by weight of pale crepe rubber was dissolved in carbon disulfide or other solvent and substantially 30 parts by weight of ditolyl phosphine mono chloride added thereto. The charge was heated to refluxing temperature for about 15 hours, the solvent then removed and the residue washed and dried all substantially as described in Example I to obtain 50.4 parts by weight of soft rubbery product.

As will be appreciated from the foregoing description and example, a wide variety of rubbers both natural and synthetic are applicable in the process of the present invention. Accordingly the term "a rubber" is employed in the claims to define a vulcanizable plastic material which possesses high extensibility under load coupled with the property of forcibly retracting to approximately its original size and shape after the load is removed. Typical rubbers which can be used in this invention include for example crude india rubber, reclaimed rubber, balata, gutta percha, chlor butadiene polymers, butadiene polymers and co-polymers which include such well known materials as Perbunan, Hycar, Buna S and Buna N; guayule, chicle, gutta-siak, juletong or pontianac, Caucho, Kickxia and Manihot rubbers, olefine polysulfide plastics, 2,3 dimethyl butadiene polymers, 2-phenyl butadiene polymers, dichlor butadiene polymers, mono- and di-olefine co-polymers and the like whether or not admixed with fillers, pigments, accelerating or vulcanizing agents or other compounding ingredients.

Again this invention is not limited to the specific examples and compositions set forth to illustrate the invention. Other solvents and other organic phosphine halides whether the pure compounds, mixtures thereof or the "crude" or "stripped" varieties and whether in the presence or absence of a Friedel-Crafts catalyst may be used in the preparation of the preferred materials as well as other means of effecting the reactions. In addition other Friedel-Crafts catalysts such as ferric chloride and stannic chloride may be employed. Other fillers, compounding and vulcanizing ingredients than those particularly mentioned may be utilized. Furthermore the new products of this invention can be admixed with other plastic or resinous materials. This invention is limited solely by the claims attached hereto as part of the present specification.

This application is a continuation-in-part of co-pending applications Serial No. 346,991, filed July 23, 1940, and Serial No. 364,598, filed November 6, 1940.

What is claimed is:

1. A new composition of matter obtained by intimately mixing a rubber with an organic phosphine halide having at least one halogen atom and at least one organic radicle directly attached to a trivalent phosphorus atom in a proportion within the range equivalent to 65–200 parts by weight of crude phosphine halide per 100 parts of rubber and heating the mixture within the range of room temperature to 140° C.

2. A new composition of matter obtained by intimately mixing a rubber with an organic phosphine halide having at least one halogen atom and at least one hydrocarbon radicle directly attached to a trivalent phosphorus atom in a proportion within the range equivalent to 65–200 parts by weight of crude phosphine halide per 100 parts of rubber and heating the mixture at a temperature within the range of room temperature to the refluxing temperature of a cement of the rubber.

3. A new composition of matter obtained by intimately mixing a rubber with an alkyl phosphine halide having at least one halogen atom and a carbon atom of at least one alkyl group directly attached to a trivalent phosphorus atom in a proportion within the range equivalent to 65–200 parts by weight of crude phosphine halide per 100 parts of rubber and heating the mixture at a temperature within the range of room temperature to the refluxing temperature of a cement of the rubber.

4. A new composition of matter obtained by intimately mixing a rubber with a technical alkyl phosphine chloride having at least one chlorine atom and at least one alkyl radicle directly attached to a trivalent phosphorus atom and consisting of the crude reaction product containing the catalyst complex of an aliphatic hydrocarbon containing at least four but less than eleven carbon atoms with $PCl_3$ in the presence of aluminum chloride catalyst and heating the mixture at least as high as room temperature but no higher than refluxing temperature of a cement of the rubber, the said phosphine halide being in a proportion within the range of 65–200 parts by weight per 100 parts by weight of rubber.

5. A new composition of matter obtained by intimately mixing a rubber with a condensed polynuclear aromatic phosphine halide comprising the structure $$R-P\begin{matrix}x\\ \\y\end{matrix}$$

where R is a condensed polynuclear aromatic radicle and $x$ and $y$ are halogen in a proportion within the range equivalent to 65–200 parts by weight of crude phosphine halide per 100 parts of rubber and heating the mixture within the range of room temperature to 140° C.

6. A new composition of matter obtained by intimately mixing india rubber with a condensed polynuclear aromatic phosphine chloride comprising the structure $$R-P\begin{matrix}Cl\\ \\Cl\end{matrix}$$

where R is a condensed polynuclear aromatic radicle in a proportion within the range equivalent to 65–200 parts by weight of crude phosphine halide per 100 parts of rubber and heating the mixture within the range of room temperature to 140° C.

7. A new composition of matter obtained by intimately mixing india rubber with at least an equal proportion by weight but not more than twice the weight of the rubber of a technical condensed polynuclear aryl phosphine dichloride having two chlorine atoms and one polynuclear aryl radicle directly attached to a trivalent phosphorus atom and consisting of the crude reaction product containing the catalyst complex of a condensed polynuclear aryl hydrocarbon and PCl₃ in the presence of aluminum chloride catalyst and heating the mixture at a temperature within the range of room temperature to the temperature of reflux of a cement of the rubber to effect a reaction characterized by the fact that the hydrocarbon content of the original rubber is materially increased.

8. A new composition of matter obtained by intimately mixing india rubber with at least an equal proportion by weight of technical naphthyl dichlor phosphine said phosphine being no more than twice the weight of the rubber and having two chlorine atoms and one naphthyl radicle attached directly to a trivalent phosphorus atom and consisting of the crude reaction product containing the catalyst complex of naphthalene and PCl₃ in the presence of aluminum chloride catalyst and heating the mixture within the range of room temperature to refluxing temperature of a cement of the rubber.

9. A new composition of matter obtained by intimately mixing a reclaimed rubber with retyl dichlor phosphine comprising the structure

where R is a retyl radicle in a proportion within the range equivalent to 65-200 parts by weight of crude retyl phosphine dichloride and heating the mixture within the range of room temperature to the refluxing temperature of a cement of the rubber.

10. A new composition of matter obtained by intimately mixing a reclaimed rubber with substantially 150 parts by weight per 100 parts by weight of rubber of technical retyl dichlor phosphine having two chlorine atoms and one retyl radicle directly attached to a trivalent phosphorus atom consisting of the crude reaction product containing the catalyst complex of technical retene and PCl₃ in the presence of aluminum chloride and heating the mixture within the range of room temperature to the refluxing temperature of a cement of the rubber.

11. The method of making a new composition of matter which comprises intimately mixing a rubber with an organic phosphine halide having at least one halogen atom and at least one organic radicle directly attached to a trivalent phosphorus atom in a proportion within the range equivalent to 65-200 parts by weight of crude phosphine halide per 100 parts of rubber and heating the mixture within the range of room temperature to 140° C.

12. The method of making a new composition of matter which comprises intimately mixing a rubber with an organic phosphine halide having at least one halogen atom and at least one hydrocarbon radicle directly attached to a trivalent phosphorus atom in a proportion within the range equivalent to 65-200 parts by weight of crude phosphine halide per 100 parts of rubber and heating the mixture at a temperature within the range of room temperature to the refluxing temperature of a cement of the rubber.

13. The method of making a new composition of matter which comprises intimately mixing a rubber with an alkyl phosphine halide having at least one halogen atom and a carbon atom of at least one alkyl group directly attached to a trivalent phosphorus atom in a proportion within the range equivalent to 65-200 parts by weight of crude phosphine halide per 100 parts of rubber and heating the mixture at a temperature within the range of room temperature to the refluxing temperature of a cement of the rubber.

14. The method of making a new composition of matter which comprises intimately mixing a rubber with a technical alkyl phosphine chloride having at least one chlorine atom and at least one alkyl radicle directly attached to a trivalent phosphorus atom and consisting of the crude reaction product containing the catalyst complex of an aliphatic hydrocarbon containing at least four but less than eleven carbon atoms with PCl₃ in the presence of aluminum chloride catalyst and heating the mixture at least as high as room temperature but no higher than refluxing temperature of a cement of the rubber, the said phosphine halide being in a proportion within the range of 65-200 parts by weight per 100 parts by weight of rubber.

15. The method of making a new composition of matter which comprises intimately mixing a rubber with a condensed polynuclear aromatic phosphine halide comprising the structure

where R is a condensed polynuclear aromatic radicle and $x$ and $y$ are halogen in a proportion within the range equivalent to 65-200 parts by weight of crude phosphine halide per 100 parts of rubber and heating the mixture within the range of room temperature to 140° C.

16. The method of making a new composition of matter which comprises intimately mixing india rubber with a condensed polynuclear aromatic phosphine chloride comprising the structure

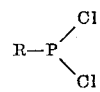

where R is a condensed polynuclear aromatic radicle in a proportion within the range equivalent to 65-200 parts by weight of crude phosphine halide per 100 parts of rubber and heating the mixture within the range of room temperature to 140° C.

17. The method of making a new composition of matter which comprises intimately mixing india rubber with at least an equal proportion by weight but not more than twice the weight of the rubber of a technical condensed polynuclear aryl phosphine dichloride having two chlorine atoms and one polynuclear aryl radicle directly attached to a trivalent phosphorus atom and consisting of the crude reaction product containing the catalyst complex of a condensed polynuclear aryl hydrocarbon and PCl₃ in the presence of aluminum chloride catalyst and heating the mixture at a temperature within the range of room temperature to the temperature of reflux of a cement of the rubber to effect a reaction characterized by the fact that the hydrocarbon content of the original rubber is materially increased.

18. The method of making a new composition of matter which comprises intimately mixing india rubber with at least an equal proportion by weight of technical naphthyl dichlor phosphine said phosphine being no more than twice the weight of the rubber and having two chlorine atoms and one naphthyl radicle attached directly to a trivalent phosphorus atom and consisting of the crude reaction product containing the catalyst complex of naphthalene and PCl₃ in the presence of aluminum chloride catalyst and heating the mixture within the range of room temperature to refluxing temperature of a cement of the rubber.

19. The method of making a new composition of matter which comprises intimately mixing a reclaimed rubber with retyl dichlor phosphine comprising the structure

where R is a retyl radicle in a proportion within the range equivalent to 65–200 parts by weight of crude retyl phosphine dichloride and heating the mixture within the range of room temperature to the refluxing temperature of a cement of the rubber.

20. The method of making a new composition of matter which comprises intimately mixing a reclaimed rubber with substantially 150 parts by weight per 100 parts by weight of rubber of technical retyl dichlor phosphine having two chlorine atoms and one retyl radicle directly attached to a trivalent phosphorus atom consisting of the crude reaction product containing the catalyst complex of technical retene and PCl₃ in the presence of aluminum chloride and heating the mixture within the range of room temperature to the refluxing temperature of a cement of the rubber.

GEORGE D. MARTIN.